Dec. 12, 1967   H. E. MILLER   3,357,758
CUSHIONED BEARING ASSEMBLY
Original Filed Jan. 4, 1962

INVENTOR
Harvey E. Miller
BY McCoy, Greene, Medert
& Te Grotenhuis
ATTORNEYS

United States Patent Office 3,357,758
Patented Dec. 12, 1967

3,357,758
CUSHIONED BEARING ASSEMBLY
Harvey E. Miller, Logansport, Ind., assignor to The General Tire & Rubber Company, Akron, Ohio, a corporation of Ohio
Original application Jan. 4, 1962, Ser. No. 164,361, now Patent No. 3,188,152, dated June 8, 1965. Divided and this application Apr. 27, 1965, Ser. No. 451,125
2 Claims. (Cl. 308—26)

ABSTRACT OF THE DISCLOSURE

This invention relates to a mounting, bearing or sealing assembly having a tubular rubber insert (9) compressed between concentric rigid metal sleeves (8 and 11) and having a sleeve member (10) interposed between the insert and one of said sleeves. Such sleeve member has many circumferential ribs and grooves (12 and 13) interfitting with similar ribs and grooves of the adjacent metal sleeve to provide a seal and to restrain axial movement.

---

This application is a division of my copending United States patent application, Ser. No. 164,361, filed Jan. 4, 1962, now Patent No. 3,188,152.

The present invention provides a bearing assembly suitable for use in various types of pivotal connections between members having relatively oscillating movements or as a support for a rotating member that includes a tubular elastic rubber cushioning element and that is designed to protect the rubber cushioning element against torsional stresses which would tend to cause circumferential slip between the rubber and the sleeves between which it is confined. The rubber insert is preferably held under radial compression between the inner and outer rigid sleeves, one of which has a cylindrical part formed of a low friction material. The low friction material is preferably a resilient plastic material such as nylon, polytetrafluoroethylene such as sold under the trade name "Teflon" or a linear acetal consisting of unbridged polyoxymethylene chains of great length such as sold under the trade name "Delrin."

One of the coaxial sleeves between which the rubber insert is retained in the assembly of the present invention is a two part sleeve composed of two relatively rotatable cylindrical parts, one fitting within the other for relative turning movements, the two part sleeve being so constructed that it can be quickly and easily assembled with the rubber insert and the coaxial rigid sleeve.

Reference should be had to the accompanying drawings forming part of this specification, in which.

In FIGURES 1 through 4 of the drawings, a bearing assembly embodying the invention is shown applied to the hinges connecting the treads of a Caterpillar tactor. These hinges permit relative angular movements of the tread sections as they pass over the tread supporting wheels and the bearing of the present invention serves as a seal to prevent escape of lubricant from the ends of the hinge pin bearings and to prevent entry of moisture and dirt into the bearing.

Figure 1:
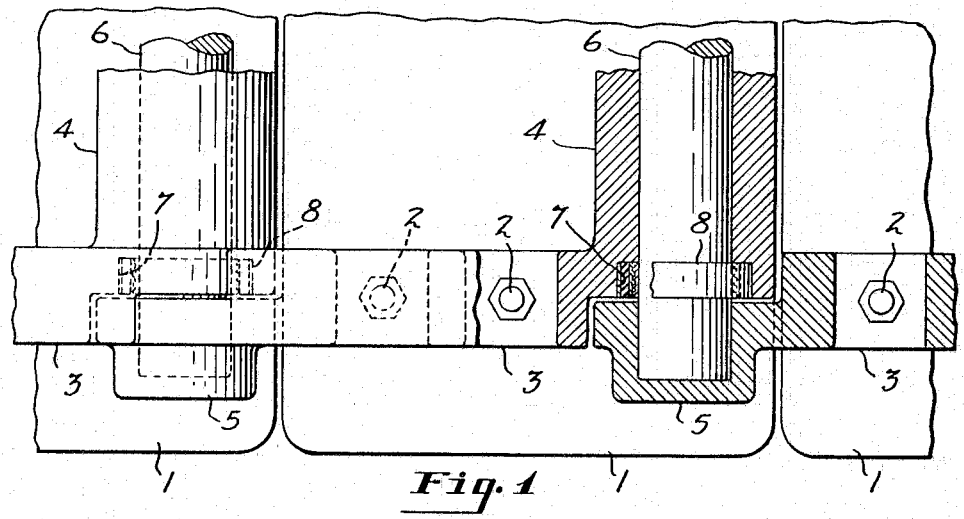
FIGURE 1 is a fragmentary top elevational view partially in section, showing an assembly embodying the invention, applied to the pivots of a Caterpillar tractor tread.
Figure 2:
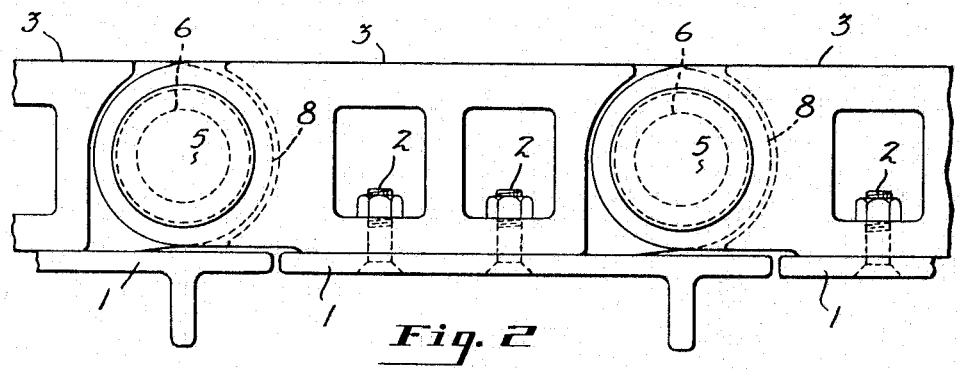
FIGURE 2 is a fragmentary side elevational view of the tractor tread shown in FIGURE 1.
Figure 3:
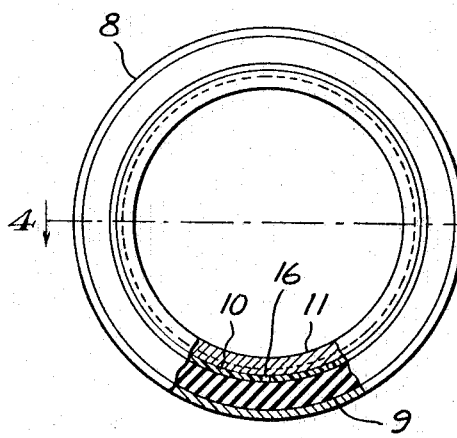
FIGURE 3 is an end elevation of the bearing assembly employed in the tread hinges with a portion broken away and shown in section.
Figure 4:
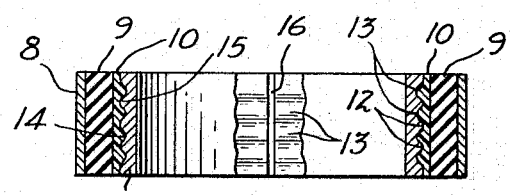
FIGURE 4 is a section taken on the line 4—4 of FIGURE 3, a portion of the inner cylindrical part of the two part bearing sleeve being broken away to show the split in the outer cylindrical part thereof.

As shown in FIGURE 1, the Caterpillar tread sections 1 are attached by means of bolts 2 to chain links 3 which are provided with integral bearing sleeves 4 extending lengthwise of one edge of each tread section and with bearing caps 5 that project past the opposite edge of each tread section and receive the bearing portions 4 of the adjacent link between them. Each of the hinged joints has a pivot pin 6 extending throughout the length of the bearing portion 4 and projecting past the ends of the bearing portion into the caps 5. Each bearing portion 4 has a counterbore 7 at each end thereof which receives a bearing assembly which has an outer circumferentially continuous rigid sleeve 8 which may be formed of metal and have a press fit within the counterbore 7. Within the sleeve 8 there is an elastic rubber insert 9 which is retained under radial compression between the outer sleeve 8 and an inner two part bearing sleeve which has an outer cylindrical part 10 which is composed of a resilient material having a low coefficient of friction and an inner circumferentially continuous cylindrical part 11 which may be formed of metal and which fits within the part 10, the parts 10 and 11 being relatively rotatable.

The outer part 10 is provided with circumferential grooves 12 which provide circumferential ribs 13 between them and the inner part 11 of the bearing sleeve has circumferential grooves 14 and ribs 15 which interfit with the ribs and grooves of the sleeve member 10. The outer sleeve part 10 is preferably formed of a resilient plastic material that has a low coefficient of friction and the bearing members 10 and 11 may turn relatively to one another without subjecting the elastic rubber insert 9 to substantial torsional stresses. The sleeve parts 10 and 11 are assembled prior to their insertion into the elastic rubber insert 9, and, in order to permit assembly, the resilient plastic member 10 is provided with a longitudinal split 16 which permits it to be expanded and slipped over the inner circumferentially continuous member 10 and contracted to bring its ribs 13 into engagement with the grooves 14 of the inner sleeve part. When so assembled, the inner bearing sleeve can be forced into the rubber insert 8 while it is confined within the outer sleeve 7 by conventional methods of assembly.

The inner sleeve part 11 may have a close fit on the pivot pin 6 so that the relative turning movement is between the plastic sleeve member 10 and the inner circumferentially continuous sleeve member 11 and the bearing is provided with an effective seal against escape of lubricant and against entry of dirt and moisture into the space between the pin 6 and the bearing sleeve 4.

The bearing assembly is designed to be capable of convenient assembly by methods now in common use such as disclosed in the patent to Beck 2,660,780, granted Dec. 1, 1953. The rubber insert 9 may be contracted and forced into the sleeve 8 by forcing it through a funnel-shaped guide which has its small delivery end registered with one end of the sleeve 8. After assembly of the insert with the sleeve 8, the inner two part bearing sleeve can be forced into the rubber insert 9 behind a suitably tapered pilot or other expanding means which expands the opening of the tubular insert 9 to a diameter to receive the bearing sleeve.

It is to be understood that in accordance with the provisions of the patent statutes, variations and modifications of the specific devices herein shown and described may be made without departing from the spirit of the invention.

What I claim is:

1. A cushioned sealing assembly comprising a rigid inner metal sleeve (11) having an internal cylindrical surface and an external surface of revolution containing a series of narrow circumferential ribs and grooves (14 and 15) spaced apart throughout the length of said sleeve, a longitudinally split resilient sleeve member (10) formed of a low friction plastic material and having an external cylindrical surface and an internal surface of revolution containing circumferential ribs and grooves (12 and 13) interfitting with the ribs and grooves of said metal sleeve, a rigid circumferentially continuous outer metal sleeve (8) having an inner cylindrical surface concentric to said inner metal sleeve and said sleeve member, and a tubular insert (9) of elastic rubber retained under radial compression between said outer metal sleeve and said low-friction sleeve member.

2. A tractor tread assembly having a series of tread sections, each section having a link rigidly connected thereto, and hinge means pivotally connecting each link to an adjacent link including a rigid outer bearing sleeve and a pivot pin fitting in said sleeve, a cushioned sealing assembly comprising an inner rigid sleeve mounted on said pivot pin, an outer rigid sleeve mounted in said bearing sleeve, a tubular insert of elastic rubber retained under compression between said sleeves, one of said sleeves being formed of metal, the other of said sleeves comprising two cylindrical parts, one fitting within the other and rotatable with respect to the other, the cylindrical part adjacent said tubular insert being composed of a resilient non-metallic low friction material and the other cylindrical part being composed of a rigid metal, said cylindrical parts having interfitting endless circular circumferential ribs and grooves spaced apart throughout the length of said cylindrical parts to prevent escape of lubricant and entry of moisture and dirt and to restrain relative axial movement of said cylindrical parts.

References Cited

UNITED STATES PATENTS

| | | |
|---|---|---|
| 2,827,303 | 3/1958 | Herbenar. |
| 3,009,746 | 11/1961 | Haushalter _____ 308—26 |
| 3,094,376 | 6/1963 | Thomas. |
| 3,107,951 | 10/1963 | Palm _____ 308—238 |
| 3,194,614 | 7/1965 | Thomas _____ 308—26 |

MARTIN P. SCHWADRON, *Primary Examiner.*

FRANK SUSKO, *Assistant Examiner.*